United States Patent Office 3,536,980
Patented Oct. 27, 1970

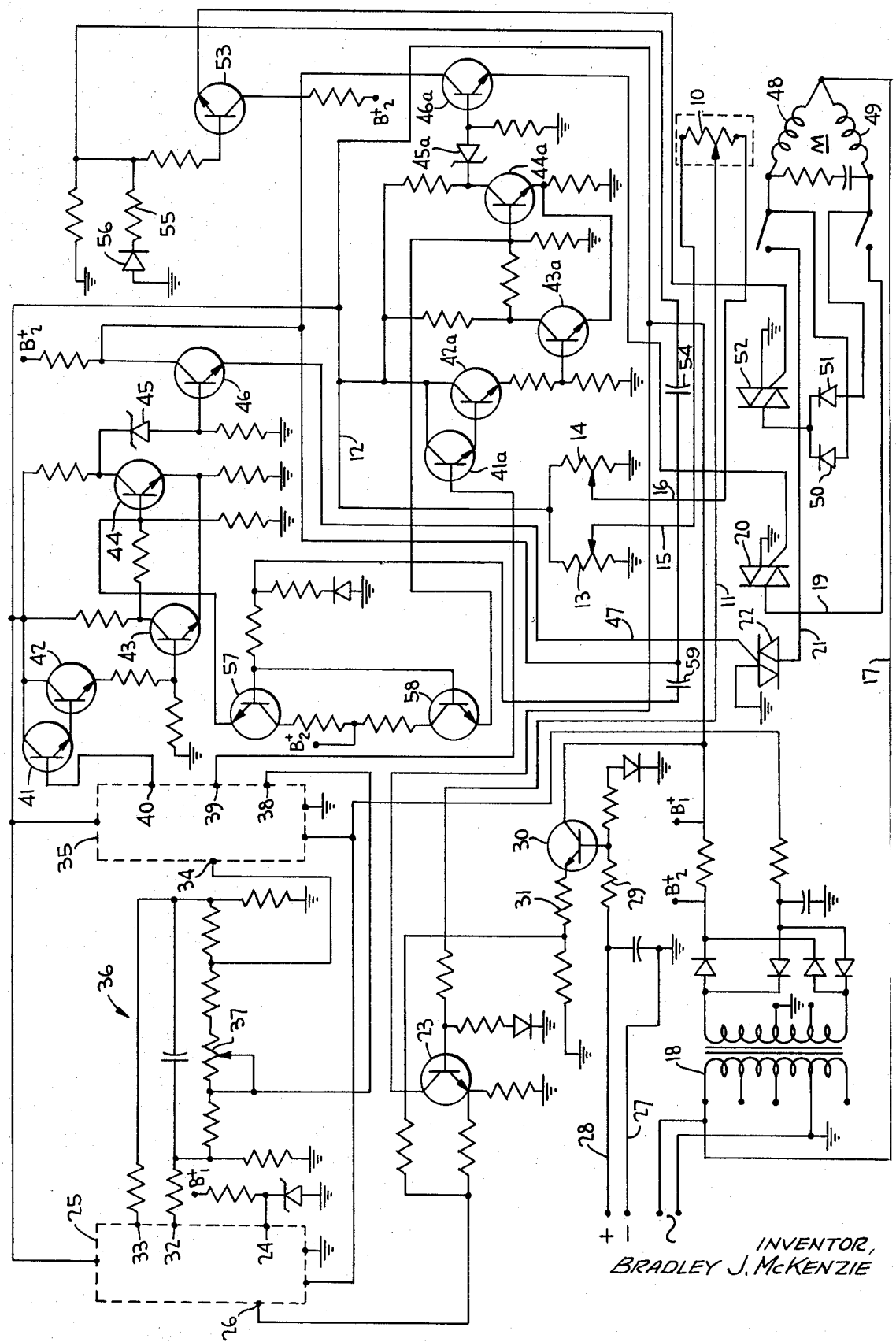

3,536,980
SOLID STATE REVERSIBLE SPLIT PHASE SERVO-MOTOR CONTROL INCLUDING BRAKING AT NULL AND MOTOR OVERLOAD PROTECTION
Bradley J. McKenzie, Shrewsbury, Mass., assignor to Jamesbury Corp., Worcester, Mass., a corporation of Massachusetts
Filed May 29, 1968, Ser. No. 740,393
Int. Cl. G05b 5/01
U.S. Cl. 318—18                                    7 Claims

ABSTRACT OF THE DISCLOSURE

The disclosure concerns a motor control system which has for its purpose changing or maintaining the position of an adjustable element as for example the fluid flow controlling element of a valve in a pipe line. The adjustable element is moved by an actuator which includes an electric motor. The existing position of the adjustable element produces a characteristic voltage. The system includes a differential amplifier which compares this characteristic voltage with a control voltage which is related to a selected position of the adjustable element. Any difference in compared voltages actuates a trigger circuit which thereupon produces a command signal which closes the power supply to the actuator motor and thus causes the actuator to move the adjustable element to the selected position. The system also includes a timing circuit which automatically suppresses command signals for intervals of sufficient duration so that the duty cycle limits of the driving motor associated with the actuator are not exceeded, and also a circuit which brakes the actuator motor when the command signal is terminated by supplying current simultaneously to both the clockwise and counterclockwise motor windings.

SUMMARY OF THE INVENTION

The invention relates to an electrical system for positioning a remote adjustable element by means of an electric motor associated with the adjustable element and which includes means for automatically limiting the period of time during which the motor may be actuated so that the limits of its thermal duty cycle are not exceeded. The invention also relates to a modification of such a system in which the limiting means has associated with it an electrical circuit which brakes the motor.

The present invention thus makes it feasible to employ smaller and less expensive motors than presently required for reliable service to actuate adjustable elements such as the fluid control element of a valve, the position of adjustable baffles or vents and the like.

BRIEF DESCRIPTION OF THE DRAWINGS

The drawing consisting of a single figure is a schematic which is exemplary of a system constructed according to the invention. A power supply for the system is shown in the lower left portion of the drawing and the field windings of an actuator motor, with the connections to them, at the lower right-hand portion. The upper left portion of the drawing discloses a pair of differential amplifiers, the output of which is related to the difference in the position of the adjustable element driven by the actuator motor and the desired position of that element as indicated by a control voltage. The upper right-hand portion of the drawing illustrates trigger circuitry which responds to the output of the differential amplifiers and creates a command voltage which gates the power supply to the motor windings, as well as related circuitry which automatically limits the duration or interval of occurrences of the command voltage and which brakes the action of the motor when the command voltage is terminated.

DESCRIPTION OF THE PREFERRED EMBODIMENT

Referring to the drawing, the windings of a reversible capacitor type motor M are shown in the lower right-hand portion of the drawing. In utilizing the invention, this motor would be connected through a gear train to the valve stem of a ball valve so that rotation of the motor shaft causes the ball to move to its open or closed positions or any position therebetween to thereby regulate the flow of fluid in a line which includes the ball valve. This type of actuator structure is commonly and widely known in the field and no further description or drawing thereof is needed. The valve actuator which includes the motor also includes a potentiometer 10 which produces an output in the conductor 11 which is related to and indicative of the position of the ball. Voltage is supplied to the potentiometer from a $B_1+$ voltage source through conductor 12 and thence through variable resistors 13 and 14 respectively to the potentiometer connections 15 and 16. These variable resistors permit adjustment of the end point and range of voltage output.

One end of each of the clockwise and counterclockwise motor windings is permanently connected through conductor 17 to the power supply 18. The power circuit through the windings is completed, respectively, through conductor 19 and solid state switch 20 to ground or through conductor 21 and solid state switch 22 to ground depending upon which one of the two windings is to be directly energized.

The output of the actuator potentiometer is applied through the conductor 11 to the base of the emitter follower 23. The output of this element is summed with a control voltage, hereafter described, and applied to terminal 26 of the differential amplifier 25. This differential amplifier may be of any commercial type but preferably a double Darlington transistor amplifier.

The other input to the amplifier 25 is a Zener regulated reference voltage level $B_1+$ against which the sum of control voltage and feedback voltage is compared. The function of the amplifier 25 is to compare the two input voltages and generate an output signal which is related to the direction in which the motor must turn in order to move the ball to the selected position, and which persists until the selected position of the ball has been attained.

The aforementioned control voltage corresponding to the selected position is applied to the motor control system at the terminals 27, 28 and passes through resistance 29, transistor 30 and resistance 31 to the amplifier input terminal 26. The transistor 30 which passes the control voltage, and the transistor 23 which passes the existing position voltage, and their associated elements are selected to match impedances between the differential amplifier and the sources of the respective voltages.

It is apparent of course that the control signal applied at 27, 28 may be produced by manual adjustment of a potentiometer or may be the output of a computer, process controller, or any other related system.

The output of the differential amplifier 25 appears between the terminals 32 and 33 and the polarity of the voltage between 32 and 33 is indicative of the direction in which the motor must turn in order to move the ball from its existing position to the selected position. The output from amplifier 25 is fed to input terminal 34 of a second differential amplifier of the same type as amplifier 25. This input is passed through a network indicated generally at 36 which provides a suitable output load impedance to amplifier 25. The network includes a variable resistor 37 which permits adjustment of the voltage level applied to amplifier 35 for a given difference in voltage inputs to amplifier 25, thus permitting a sensitivity or gain adjustment. The network rise serves to permit compensation for amplifier offset, that is, adjustment in effect of the voltage appearing at the output terminals to the identical levels while the input levels are identical. The adjusted voltage is applied to input terminals 34, 38 and the amplified output appears at terminals 39 and 40. The output appearing at these terminals also has a polarity which is indicative of the direction in which the motor must turn in order to move the ball to the selected position. The output from each of these terminals is each connected to a trigger circuit and depending upon its polarity one or the other of the two trigger circuits is activated. The output of the trigger circuit is, in turn, used to gate a solid state switch which closes the power supply circuit through either the clockwise or counterclockwise windings of the motor.

The output from terminal 40 is passed through the Darlington coupled transistor pair 41, 42 to provide the necessary output impedance for the amplifier 35, and then applied to a trigger circuit comprising transistors 43, 44. In the quiescent condition of this trigger circuit the transistor 44 is conducting and transistor 43 is cut off so that the voltage in the collector circuit of transistor 44 is at some low value. When a signal of the correct polarity is applied to the trigger circuit transistor 43 goes into conduction and transistor 44 is cut off whereupon the voltage in its collector circuit rises and causes the Zener diode 45 to conduct. A rising voltage is then applied to the base of the gating transistor 46 which thereupon conducts. This creates a gating signal which is passed by conductor 47 to energize the solid state switch 22, and as earlier described, completing the power circuit through field winding 48. This causes the motor to turn in the direction which will move the ball towards the selected position. As the ball turns the output of the potentiometer 10 is altered progressively to reflect the progressively changing position of the ball as it moves toward the selected position. When the output from the potentiometer 10 matches that required by the control circuit the output at terminals 32, 33 is balanced and this in turn causes a balanced output of amplifier 35 whereupon the triggering signal on the multivibrator 43, 44 is removed and the trigger circuit reverts to its quiescent state. Thereupon the voltage in the collector circuit of transistor 44 drops to a point where the conduction through Zener diode 45 ceases. This causes gating transistor 46 to turn off and remove the gate signal which is energizing the solid state switch 22. Thereupon the power circuit through winding 48 of the motor is opened and the motor is de-energized.

The output terminal 39 of the amplifier 35 is connected to circuitry similar to that to which the terminal 40 is connected. Consequently, the arrival of a rising positive signal of sufficient magnitude at terminal 39 will result in solid state switch 20 being energized and the power circuit through winding 49 being completed, whereby the motor is caused to turn in the direction opposite to that which is caused by direct energization of winding 48. The elements in the circuit connected to output terminal 39 which correspond with those described above with reference to terminal 40 are designated by the corresponding number with a suffix a.

The motor control system includes a circuit for braking the motor to minimize motor-gear train coasting upon termination of the gating signals which energize ether the solid state switch 20 or 22 as the case may be. This is accomplished by simultaneously feeding a pulsating DC voltage to each of motor windings 48 and 49. The AC current of the power supply circuit is rectified in the diodes 50, 51 when the solid state switch 52 is energized. This switch is energized by a gating signal supplied by the transistor 53 at the time when the command signal supplied by the output of either of the two trigger circuits is terminated. In the quiescent state, the collector circuits of the gating transistors 46 and 46a are essentially at $B_2+$, transistor 53 is turned off and capacitor 54 is charged to $B_2+$ voltage. When either transistor 46 or 46a conducts to produce a gating signal which will result in actuating the motor the voltage in the collector circuits drops rapidly. This causes a rapid discharge of the capacitor 54 which is connected into the base circuit of the transistor 53. The discharge is made through resistance 55 and diode 56. Upon termination of the gating signal the voltage in the collector circuits of either transistor 46 or 46a rises rapidly causing capacitor 54 to charge and thereby apply to the base of transistor 53 a voltage which will cause it to conduct. Thereupon a gating signal is produced by transistor 53 which energizes the solid state switch 52 and thereby causes rectified DC voltage to flow simultaneously to both field windings 48 and 49. This braking action is discontinued when capacitor 54 is again charged to $B_2+$ voltage and conduction by transistor 53 is terminated.

In order to prevent the thermal duty cycle of the motor from being exceeded, a circuit including the capacitor 59 limits the time during which the motor can be operated. Capacitor 59 is somewhat larger than the capacitor 54 and it too is discharged when the voltage in the collector circuit of the gating transistor 46 or 46a drops due to conduction by one or the other. Upon return of the voltage in the collector circuits to $B_2+$, capacitor 59 begins to charge and a rising voltage is applied to the base elements of transistors 57 and 58, causing them to conduct and thereby resulting in $B_2+$ voltage being applied to the bases of 44 and 44a, respectively. This voltage appearing in the base circuits of transistors 44 and 44a clamps them in their conductive state, thereby preventing a new control signal from commanding a position change. Consequently, during the period of time that capacitor 59 is charging neither transistor 46 nor 46a can produce a gating signal to energize the solid state switches 20, 22 in the power circuit to the field windings of the motor, irrespective of whether a voltage of proper polarity appears at the terminals 39, 40 of the amplifier 35 during this interval. When the capacitor 59 reaches $B_2+$ voltage, transistors 57 and 58 are turned off and the clamping action on transistors 44 and 44a is removed. The system is then in condition to respond to signals appearing at the terminals 39, 40 of the amplifier 35. The value of the capacitor 59 is selected so that the interval of time during which the system is disabled is sufficient to observe the duty cycle limitations of the motor M.

What is claimed is:

1. A system for positioning an element in a selected one of a plurality of positions comprising a motor, means connecting said motor to said element to move said element, means for generating a desired position signal representative of said selected position for said element, means for generating a present position signal representative of the actual position of said element, means for receiving said present position signal and said desired position signal, said receiving means including means for producing an output signal representative of the direction in which said element must be moved to place it in said selected position, a trigger circuit, means for applying said output signal to said trigger circuit to change said trigger circuit from a first state to a second state, means for energizing said motor to move said element, means interruptably connecting said energizing means to said motor, said interruptably connecting means including means for connecting said energizing means to said motor when said trigger circuit is in its second state and meants for disconnecting said energizing means from said motor when said trigger circuit is in its first state, a timing circuit, means connecting said timing circuit to said trigger circuit, said timing circuit including means to disable said trigger circuit for a predetermined interval in response to a change of said trigger circuit from its second state to its first state thereby preventing the connection of said energizing means to said motor during said predetermined interval.

2. A system for positioning an element as set forth in claim 1 wherein said receiving means further includes means to generate a reference signal, means to sum said present position signal and said desired position signal to generate a sum signal, and means to compare said sum signal with said reference signal.

3. A system for positioning an element as set forth in claim 1 wherein said timing circuit includes storage means, means for changing the storage level of said storage means, and means for disabling said trigger circuit only as long as said storage means changes in storage level.

4. A system for positioning an element as set forth in claim 3 wherein said storage means is a capacitor and wherein said trigger circuit is disabled only as long as said capacitor increases in voltage level.

5. A system for positioning an element as set forth in claim 4 including means for fully charging said capacitor when said trigger circuit is in its first state, means permitting said capacitor to discharge when said trigger circuit is in its second state and means for disabling said trigger circuit while said capacitor is being fully charged after said trigger circuit has changed from its second state to its first state.

6. A system for positioning an element as set forth in claim 1 wherein said motor includes a first winding which when energized causes said motor to turn in a clockwise direction and a second winding which when energized causes said motor to turn in a counterclockwise direction, means for braking said motor by simultaneously energizing said first and second windings, and means for actuating said braking means in response to the change of said trigger circuit from its second state to its first state.

7. A system for positioning an element as set forth in claim 6 wherein said means for braking said motor includes a capacitor and wherein said braking means is actuated only as long as said capacitor increases in voltage level.

References Cited

UNITED STATES PATENTS 3,424,959   1/1969   Gruner.

THOMAS E. LYNCH, Primary Examiner

U.S. Cl. X.R.

318—203, 207, 227, 566